A. H. DAVIDSON.
CLOSE CUTTING LAWN MOWER.
APPLICATION FILED JUNE 3, 1912.
1,067,900.
Patented July 22, 1913.
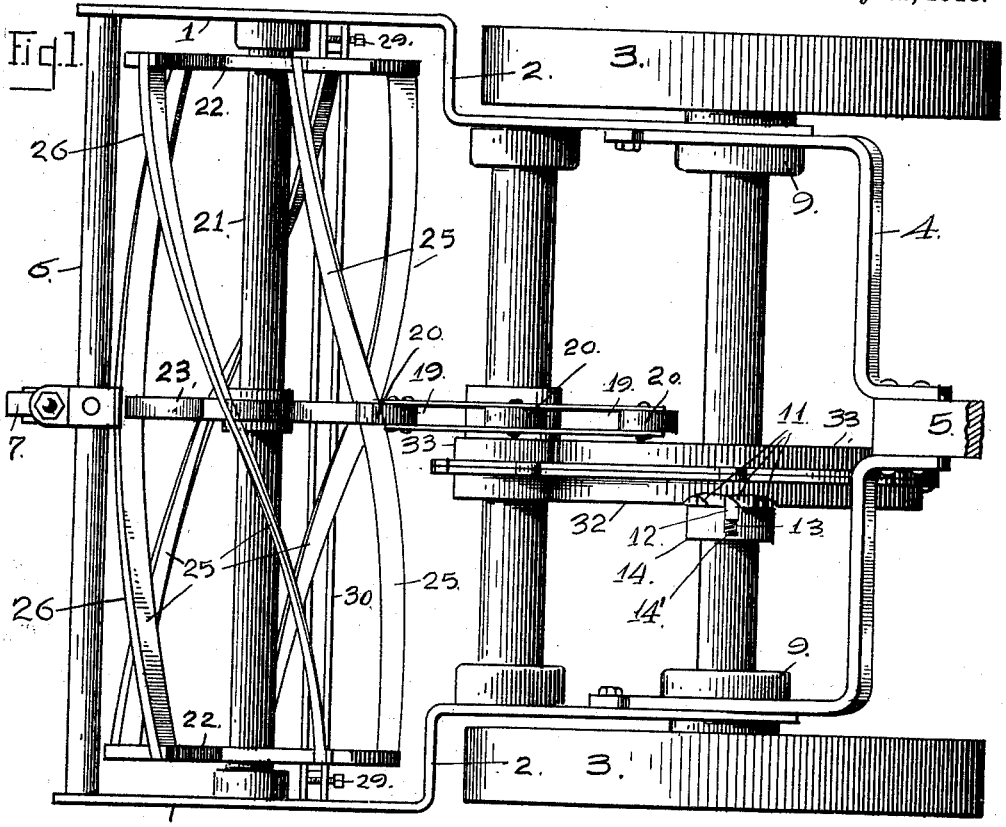
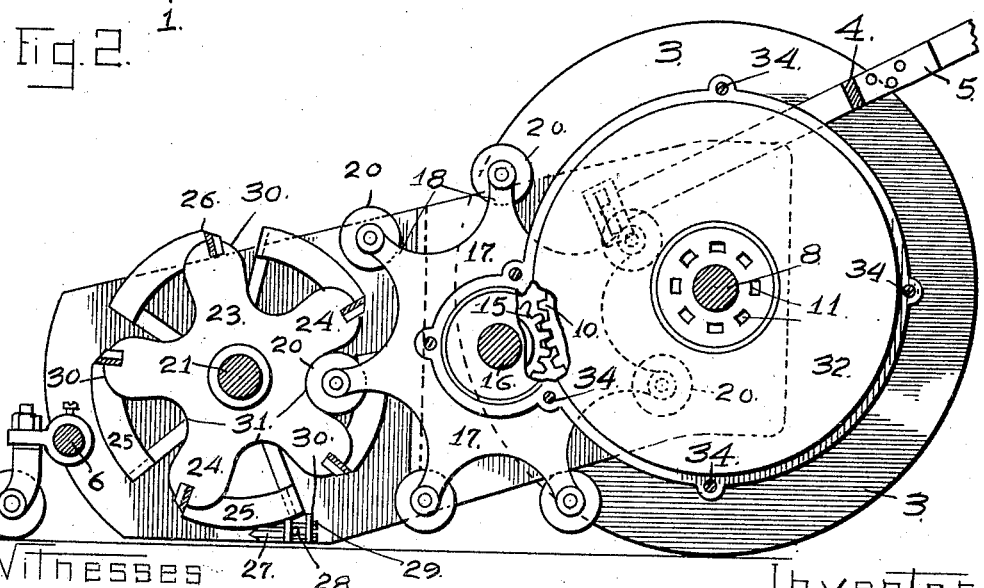
Witnesses
Arthur L. Slee.
Harry H. Totten.
Inventor
Alexander H. Davidson
by N. A. Acker,
his Atty.

UNITED STATES PATENT OFFICE.

ALEXANDER H. DAVIDSON, OF COLMA, CALIFORNIA.

CLOSE-CUTTING LAWN-MOWER.

1,067,900.      Specification of Letters Patent.      Patented July 22, 1913.

Application filed June 3, 1912. Serial No. 701,424.

*To all whom it may concern:*

Be it known that I, ALEXANDER H. DAVIDSON, a citizen of the United States, residing at Colma, in the county of San Mateo and State of California, have invented certain new and useful Improvements in Close-Cutting Lawn-Mowers, of which the following is a specification.

The hereinafter described invention relates to improvements in rotary lawn mowers adapted for cutting grass close to the walls, copings and fences, and has for its principal object to provide a noiseless operating means for mowers of the above type, which is so constructed as to operate in conjunction with one of the supporting members for the rotary knives, and dispensing with the noisy gears at each end of the rotary knife supporting shaft as are now universally in use.

Another object is to provide a drive means of the above type which is formed with noiseless anti-friction engaging means and by the use of which rotary cutting blades which project a greater distance from their supporting means may be employed than heretofore, and the same will not contact with the driving mechanism as is the case with previous machines of this type.

With the above mentioned and other objects in view, the invention consists in the construction and novel combination of parts hereinafter fully described, illustrated in the accompanying drawing and pointed out in the claims hereto appended Referring to the drawings wherein is disclosed a complete constructed device for carrying out my invention, Figure 1 is a top plan view of a mower disclosing the frame, the drive shaft, and mower drive and supporting wheels, the knife reel and the knives mounted thereon, the driven shaft, the casing inclosing the gears from the drive to the driven shaft, and the drive disk intermeshing with the central spider of the knife reel. Fig. 2 is a longitudinal sectional view of the mower disclosing the drive disk on the drive shaft, the anti-friction rollers at the outer end of the teeth thereof, and the construction of a supporting spider of the knife reel.

Referring more particularly to the drawings, the reference numeral 1 designates the side members of a supporting frame, bent inwardly as at 2, providing a recess at each side thereof for the reception of the supporting and drive wheels 3, and connected at their rear ends by the pivotally mounted supporting members 4 of a handle 5, and at their front ends by a transversely extending rod 6; the rod 6 mounting a suitable caster 7 for supporting the front end of the frame.

The supporting and drive wheels 3 are keyed to rotate a drive shaft 8, rotatably mounted in bearings 9 in the side members of the frame. A gear 10 is rotatably mounted on the shaft 8, and is provided at one side thereof adjacent its center, with a series of beveled ratchets 11 into which is adapted to project a bevel ended pawl 12 projecting from a recess 13 in a collar 14, keyed to rotate with the shaft 8, the pawl being normally forced outwardly by a coiled spring 14'; thus providing a means whereby the frame may be drawn rearwardly without rotating the gear 10.

Intermeshing with the gear 10 is a pinion 15 which is keyed to rotate with a driven shaft 16 journaled in bearings in the frame, the pinion carrying at one side a gear wheel 17 formed with radially projecting arms 18 slotted as at 19 and carrying at their outer ends in the slotted portion rotatably mounted anti-friction rollers or disks 20, preferably constructed of fiber or other suitable material.

Journaled in bearings adjacent the front of the frame and extending transversely thereof, is a shaft 21 provided with end supporting spiders 22 and a central supporting spider or disk 23 all keyed to rotate therewith. The spiders are each formed with radially extending arms 24 to the outer ends of which are secured suitable curved knives 25 adapted to extend the full width of the frame and the cutting edges 26 of which project slightly beyond the edges of the arms 24, the structure hereinafter termed a knife reel.

A knife 27 extending the full width of the frame is positioned at the bottom edge thereof below the shaft 21 and is pivoted to the sides 1 of the frame, as at 28, the same being adjusted by screw bolts 29 adjustable in brackets 30 projecting inwardly from the frame. The knife 27 is adapted to contact with the grass to be cut and is acted upon by the knives 25 in the usual manner. The ends of the arms 24 of the central spider or disk 23 are rounded as at 30 and that portion of the disk between the arms is cut in the form of an arc 31, of substantially the same diameter as the anti-friction rollers 20, the rollers engaging the arms and in the recesses thus formed and rotating the shaft 21 carrying the knives 25. The gear 10 and pinion are inclosed in a suitable dust proof gear casing formed of the sections 32 and 33 which are detachably secured together by suitable bolts 34.

It will be observed that as the mower is operated and gear 17 is rotated, the disks 20 carried by the arms 19 thereof, will engage the rounded end of the arms 24, will roll into the arcuate cut out or recess 31, and as they are about to disengage from the arm following the arm first engaged, will roll from the rounded end thereof; the knives falling between the arms 19 and a noiseless roller drive is provided. The pawl and ratchet mechanism carried respectively by the gear 10 and shaft 8 will permit the mower being drawn rearwardly without rotating the cutting blades.

Having thus fully described my invention what is claimed as new and desired to be protected by Letters Patent is—

1. In a close cutting lawn mower, the combination with a frame having depressions in the sides thereof, a drive shaft, supporting and drive wheels therefor positioned in the depressions of said frame, a driven shaft, a gear on said drive shaft, a pinion on said driven shaft intermeshing with said gear, a driving disk rotatable with said driven shaft and positioned midway of the length thereof, said disk provided with radiating arms forming teeth and carrying at their outer ends rotatable anti-friction devices, a knife reel formed of a plurality of supporting spiders rotatable with a supporting shaft, one of said spiders providing a reel disk and formed with radiating arms and arcuate depressions between the same in which are adapted to engage the anti-friction devices of said driving disk to rotate said reel, knives extending longitudinally of said reel, the cutting edges thereof projecting beyond the outer edges of said supporting spiders at an angle thereto, the reel disk providing a central support for said knives and the cutting edges thereof projecting beyond the ends of said radiating arms and falling short of contacting with the driving disk between the radiating arms thereof to prevent the dulling of said knives, and an adjustable knife adapted to coact with said rotating knives to engage the grass and sever the blades thereof.

2. In a close cutting lawn mower, the combination with a frame, a drive shaft, supporting and drive wheels therefor, a driven shaft, a gear on said drive shaft, a pinion on said driven shaft intermeshing with said gear, a driving disk rotatable with said driven shaft, said disk provided with radiating arms forming teeth, rotatable anti-friction devices carried at the outer ends of said teeth, a knife reel formed of a plurality of supporting spiders rotatable with a supporting shaft, one of said spiders providing a reel disk and formed with radiating arms and arcuate depressions between the same in which are adapted to engage the anti-friction devices of said driving disk to rotate said reel, knives extending longitudinally of said knife reel, the cutting edges thereof projecting beyond the edges of said supporting spiders, the reel disk providing one of the supports for said knives and the cutting edges of said knives projecting beyond the ends of said radiating arms and falling short of contacting with the driving disk between the radiating arms thereof, and a knife carried by the frame and adapted to coact with said rotating knives to engage the grass and sever the blades thereof.

In testimony whereof I have signed my name to this specification in the presence of two subscribing witnesses.

ALEXANDER H. DAVIDSON.

Witnesses:
  N. A. ACKER,
  D. B. RICHARDS.

Copies of this patent may be obtained for five cents each, by addressing the "Commissioner of Patents, Washington, D. C."